UNITED STATES PATENT OFFICE 2,574,150

ACENAPHTHENYL AMINO ALCOHOLS

James F. Kerwin and Glenn E. Ullyot, Philadelphia, Pa., assignors to Smith, Kline & French Laboratories, Philadelphia, Pa., a corporation of Pennsylvania No Drawing. Application May 24, 1949,
Serial No. 95,154

6 Claims. (Cl. 260—570.5)

This invention relates to new compositions of matter having utility as intermediates for the production of certain compounds having desirable physiological properties, more particularly adrenolytic or sympatholytic properties.

The new compounds according to this invention are acenaphthenyl amino alcohols with the nitrogen linked to the 7-position of the acenaphthene ring system and have the general formula:

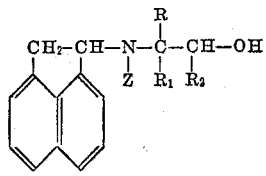

in which:

Z is a member of the group consisting of lower alkyl groups, lower alkenyl groups, phenylalkyl groups, the alkyl portion of which does not exceed 4 carbon atoms, methoxy-substituted phenyl alkyl groups, the alkyl portion of which does not exceed 4 carbon atoms;

R, $R_1$ and $R_2$ are members of the group consisting of hydrogen and methyl.

The inorganic and organic salts of the compounds according to this invention, such as will readily be formed with, for example, inorganic and organic acids, such as hydrochloric, sulfuric, sulfamic, tartaric, glycolic, phosphoric, succinic, maleic, hydrobromic, and the like, are contemplated as included within this invention.

The compounds according to this invention, as free bases or salts, will have utility as intermediates for the formation, by treating with any well known agent for replacing a hydroxyl group with a halogen, as thionyl chloride or bromide or concentrated hydrochloric or hydrobromic acid, or the like, of, for example, β-haloethylamines having the following structure in which Z, R, $R_1$ and $R_2$ are as given above and X is chlorine or bromine:

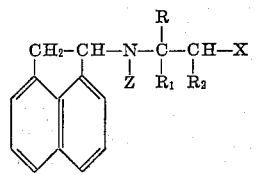

and their salts.

The compounds contemplated by this invention may be prepared by various procedures. However, as generally illustrative of procedure for the preparation of the several compounds and as exemplifying preferred procedure for their preparation, they will variously be prepared by a process which will be made apparent by the following scheme:

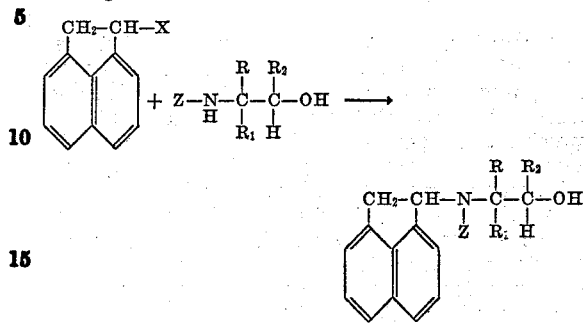

It will be appreciated that in the above scheme illustrative of the process for preparing compounds in accordance with this invention Z, R, $R_1$ and $R_2$ represent the atoms in groups as designated with reference to the above general formulae for the compounds contemplated by this invention.

In proceeding for the preparation of compounds according to this invention, the starting material 7-chloroacenaphthene or 7-bromoacenaphthene may be readily prepared by reacting 7-acenaphthenol and thionyl chloride or thionyl bromide in the presence of pyridine. By way of example 7-chloroacenaphthene will melt at 38°-39° C.

The reaction between 7-chloroacenaphthene or 7-bromoacenaphthene and the amino alcohol, i. e., the step in the process exemplified above, will be carried out conveniently in an inert solvent, such, for example, as benzene, toluene, xylene, or the like. An excess of the amino alcohol may be used to remove the hydrogen halide formed in the reaction or, as will be obvious to those skilled in the art, another acid binding agent may be employed. The amino alcohol product may be isolated as free base by distilling off the solvent or may be converted into a hydrohalide salt by obvious procedure and purified by recrystallization.

Where the amino alcohol is obtained as a hydrohalide salt, the salt may be readily converted to the free base by interaction with one equivalent of a strong base, as, for example, sodium hydroxide, in usual and well known manner, for example, by the addition of the strong base to a cold aqueous solution of the salt. The free base may be isolated by extraction into an organic solvent such as ether or benzene.

For the preparation of any desired inorganic or organic salt, the free base will be reacted in usual well known manner with the appropriate inorganic or organic acid.

As more specifically illustrative of compounds in accordance with this invention and of specific procedure for the preparation thereof, the following examples will exemplify compounds of the several types contemplated and procedure for the preparation thereof and will, in connection with the foregoing general definition of the compounds contemplated and their preparation, make apparent to those skilled in the art the structure of all the several compounds contemplated by this invention and procedure for their preparation:

EXAMPLE 1

N-(7-acenaphthenyl)-N-ethylaminoethanol hydrochloride

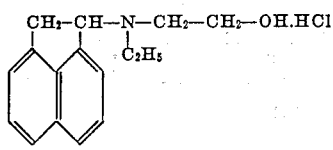

A solution of 20.5 g. of 7-chloroacenaphthene, 19 g. of ethylaminoethanol in toluene is heated for three hours between 85–100° C. Ether is added to the cooled reaction mixture and the precipitated ethylaminoethanol hydrochloride removed by filtration. The filtrate is washed with water, dried over anhydrous potassium carbonate and acidified with anhydrous hydrogen chloride. Recrystallization of the hydrochloride from alcohol and ether containing a small amount of dry hydrogen chloride gives a colorless solid which melts at 150.5°–152.5° C.

As illustrative of utility seventeen grams of the above amino alcohol in the form of its hydrochloride is suspended in dry chloroform and a solution of 8.8 g. of thionyl chloride in 20 ml. of chloroform is added with cooling. The reaction mixture is then heated at 35° C. for one-half hour and finally heated to reflux for one and one-half hours. The solvent is removed under reduced pressure and the product N-(7-acenaphthenyl)-N-ethyl-β-chlorethylamine hydrochloride is recrystallized from alcohol and ether. It melts at 197.5–198° C.

The hydrochloride of the above produced N-(7-acenaphenyl)-N-ethylaminoethanol is converted to the free base by treatment thereof in cold aqueous solution with one equivalent of sodium hydroxide in well known manner. The free base is isolated from the mixture by quickly extracting it with an organic solvent, such as, for example, ether or benzene. The free base of the β-chlorethylamine may be obtained by the same procedure.

Organic and inorganic salts will be prepared by adding the desired organic or inorganic acid to a solution of the free base in, for example, ether, in the usual and well known manner.

EXAMPLE 2

N-(7-acenaphthenyl)-N-benzylaminoethanol hydrochloride

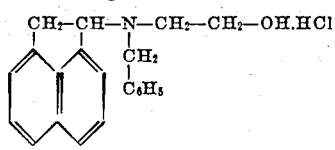

Seventy-two grams of 7-chloroacenaphthene, 116 g. of benzylaminoethanol and 140 ml. of benzene are stirred at 75° C. for fourteen hours. Ether is added to the cooled reaction mixture and the benzylaminoethanol hydrochloride is removed by filtration. Addition of dry hydrogen chloride to the filtrate forms N-(7-acenaphthenyl)-N-benzylaminoethanol hydrochloride which, after recrystallization from alcohol, melts at 228–230° C.

As illustrative of use of the product, a mixture of 34 grams of N-(7-acenaphthenyl)-N-benzylaminoethanol hydrochloride, 14.3 g. of thionyl chloride and 250 ml. of chloroform is refluxed for two hours. The solvent is removed by distillation under reduced pressure and the residue is recrystallized from n-amyl alcohol. N-(7-acenaphthenyl)-N-benzyl-β-chloroethylamine hydrochloride melts at 196–197.5° C.

The free base and inorganic and organic salts will be obtained as heretofore made perfectly apparent.

EXAMPLE 3

N-(7-acenaphthenyl)-N-methylaminoethanol hydrochloride

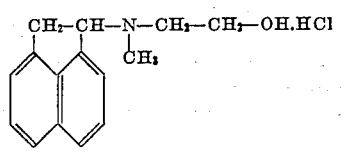

This compound will be prepared by the procedure of Example 1 using an equivalent amount of methylaminoethanol instead of ethylaminoethanol. The compound may be used as an intermediate following the procedure of Example 1.

The free base and inorganic and organic salts will be obtained as heretofore made perfectly apparent.

EXAMPLE 4

N-(7-acenaphthenyl)-N-(iso-isoamyl)-aminoethanol hydrochloride

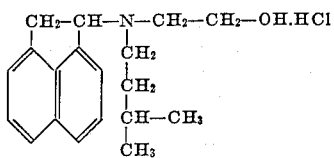

The procedure of Example 1 will be used with the ethylaminoethanol replaced by an equimolar amount of isoamylaminoethanol, and Example 1 exemplifies use of the compound.

The free base and inorganic and organic salts will be obtained as heretofore made perfectly apparent.

EXAMPLE 5

N-(7-acenaphthenyl)-N-allylaminoethanol hydrochloride

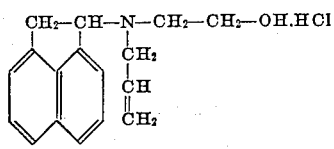

This compound will be formed by reaction of 7-chloroacenaphthene with allylaminoethanol and, as an intermediate, may be further reacted with thionyl chloride, all by the method described under Example 1.

The free base and inorganic and organic salts will be obtained as heretofore made perfectly apparent.

EXAMPLE 6

*N-(7-acenaphthenyl)-N-ethyl-1-amino-2-aminopropanol hydrochloride*

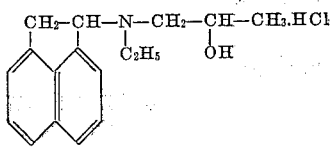

This compound will be made in the same manner as Example 1 except that 1-ethylamino-2-propanol will replace ethylaminoethanol, and may be used as an intermediate as shown in Example 1.

The free base and inorganic and organic salts will be obtained as heretofore made perfectly apparent.

EXAMPLE 7

*N-(7-acenaphthenyl)-N-ethyl-2-amino-1-aminopropanol hydrochloride*

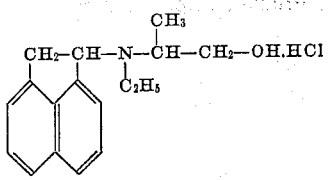

The procedure of Example 1 will be followed with 2-ethylamino-1-propanol used in place of ethylaminoethanol; and Example 1 illustrates use of the compound.

The free base and inorganic and organic salts will be obtained as heretofore made perfectly apparent.

EXAMPLE 8

*N-(7-acenaphthenyl)-N-(p-methoxyphenylisopropyl)-amino ethanol hydrochloride*

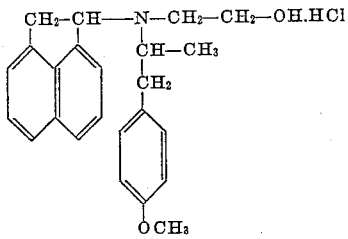

This compound will be prepared as described under Example 2 except that p-methoxyphenylisopropylaminoethanol will be used instead of benzylaminoethanol; and as an intermediate may be used following the procedure of Example 1. The p-methoxyphenylisopropylaminoethanol is prepared by adding ½ mole of p-methoxyphenylacetone to a cool solution of 30.5 grams of ethanolamine to 75 ml. of alcohol. The solution is agitated under 3-4 atmospheres of hydrogen pressure in the presence of 0.5 gram of platinum oxide catalyst. When the hydrogen uptake is substantially complete, the catalyst is filtered off and the alcohol is removed by distillation. The residue is poured into 200 ml. of 3 N hydrochloric acid; the insoluble material extracted into ether; and the aqueous acid layer is separated and made basic with sodium hydroxide solution. The product is dried and distilled, b. p. 154-157° C. at 2 ml. pressure.

The free base and inorganic and organic salts will be obtained as heretofore made perfectly apparent.

From the above general and specific disclosure all of the several acenaphthenyl amino alcohols and inorganic and organic salts thereof contemplated by this invention are made perfectly apparent to those skilled in the art, it being only necessary for the chemist to substitute the atoms and groups, all of which are common and well known to the chemist, corresponding to any particular compound or salt thereof in the general formulae given, it being obvious that the structural formula for each and every of the compounds can be written and understood by anyone having any knowledge of chemistry.

From the foregoing general and specific disclosure of procedure for the preparation of the compounds and salts thereof contemplated by this invention, it is apparent to those skilled in the art that all the compounds and salts will be prepared by the procedure described and exemplified by the mere use of the reagents corresponding to any particular compound desired, the reagents for any particular compound being either well known or prepared by the procedure indicated and affording no problem to the chemist.

While in the foregoing examples the product in accordance with this invention are exemplified by their hydrochloride salts, the several examples will serve as specific examples of free bases by the mere deletion of the acid radical. As has been indicated, where the compounds are obtained as salts, the free bases will be obtained from the salts by usual and well known procedure comprising treatment with an inorganic base such as sodium carbonate, sodium hydroxide, or the like.

The above general formula will serve as specifically exemplifying all the several compounds embraced thereby by a mere substitution in the formula for Z, R, R₁ and R₂ of the substituents given therefor in connection with the formula, i. e., a mere mechanical exercise, hence this specification is not rendered voluminous by the setting forth of formulae for each and every compound contemplated and each and every salt thereof, respectively, such being quite unnecessary in view of the disclosure which makes the structure of each and all thereof entirely clear to those skilled in the art.

This application is a continuation-in-part of application Serial No. 65,508, filed December 15, 1948, now Patent Number 2,569,814.

What is claimed is:

1. Acenaphthenyl amino alcohols having the structure

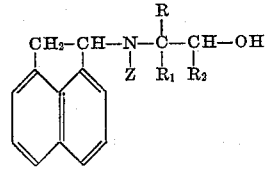

in which Z is a member of the group consisting of lower alkyl groups, lower alkenyl groups, phenylalkyl groups, the alkyl portion of which does not exceed 4 carbon atoms, methoxy-substituted phenyl alkyl groups, the alkyl portion of which does not exceed 4 carbon atoms; R, R₁ and R₂ are members of the group consisting of hydrogen and methyl; and organic and inorganic salts of said compounds.

2. The compound having the structure:

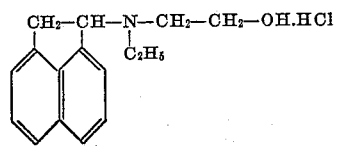

3. The compound having the structure:

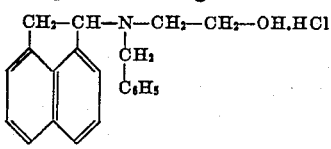

4. The compound having the structure:

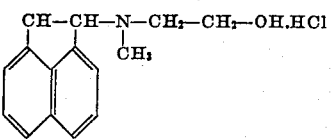

5. The compound having the structure:

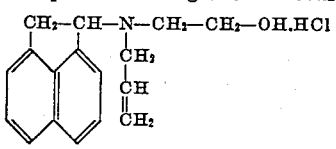

6. The compound having the structure:

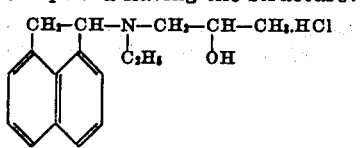

JAMES F. KERWIN.
GLENN E. ULLYOT.

REFERENCES CITED

The following references are of record in the file of this patent:

FOREIGN PATENTS

| Number | Country | Date |
|---|---|---|
| 134,626 | Austria | Apr. 15, 1933 |

OTHER REFERENCES

Achenbach et al., Fed. Proc., vol. 6, pages 304–305.

Hunt, J. Pharm. Exp. Therapy, vol. 95, pages 177–184.